United States Patent [19]
Duffy

[11] Patent Number: 5,271,777
[45] Date of Patent: Dec. 21, 1993

[54] HIGH EFFICIENCY COIL FABRICATION PROCESS

[75] Inventor: Michael Duffy, Sandy Hook, Conn.

[73] Assignee: Hughes Aircraft Company, Los Angeles, Calif.

[21] Appl. No.: 808,840

[22] Filed: Dec. 17, 1991

[51] Int. Cl.$^5$ .............................................. C21D 9/52
[52] U.S. Cl. .................... 148/537; 148/687; 148/679
[58] Field of Search ............ 148/537, 568, 576, 595, 148/596, 679, 687

[56] References Cited

FOREIGN PATENT DOCUMENTS 825539 12/1959 United Kingdom ................ 148/687

Primary Examiner—Deborah Yee
Attorney, Agent, or Firm—Michael W. Sales; Wanda K. Denson-Low

[57] ABSTRACT

Mill annealed commercial insulated copper wire 20 used to fabricate high Residual Resistivity Ratio (RRR) windings 12 is unwound from a supply spool 22 and wound onto an annealing spool 24, annealed on the annealing spool 24, and unwound from the annealing spool 24 and wound onto an actuator bobbin 18. The annealing spool 24 is selected to have the same outside diameter as the actuator bobbin 18. The temperature of a single layer of wire 32 on the annealing spool 24 is raised in an incremental fashion to an annealing temperature in a vacuum furnace. The annealing spool 24 is held at the annealing temperature for a period of time at least equal to the annealing time required for the single layer of wire 32 and not longer than the survival time of an insulative coating on the single layer of wire 32. After annealing, the annealing spool 24 is cooled naturally to room temperature partially under vacuum and partially in an inert gas atmosphere. A high RRR wire 34 resulting from annealing is unwound from the annealing spool 24 and wound onto the actuator bobbin 18. During unwinding and winding tension and bend radius is controlled. Also, a heat conductive coating for removing heat from the winding is simultaneously applied to the annealed insulated copper wire during the winding and unwinding process.

26 Claims, 3 Drawing Sheets

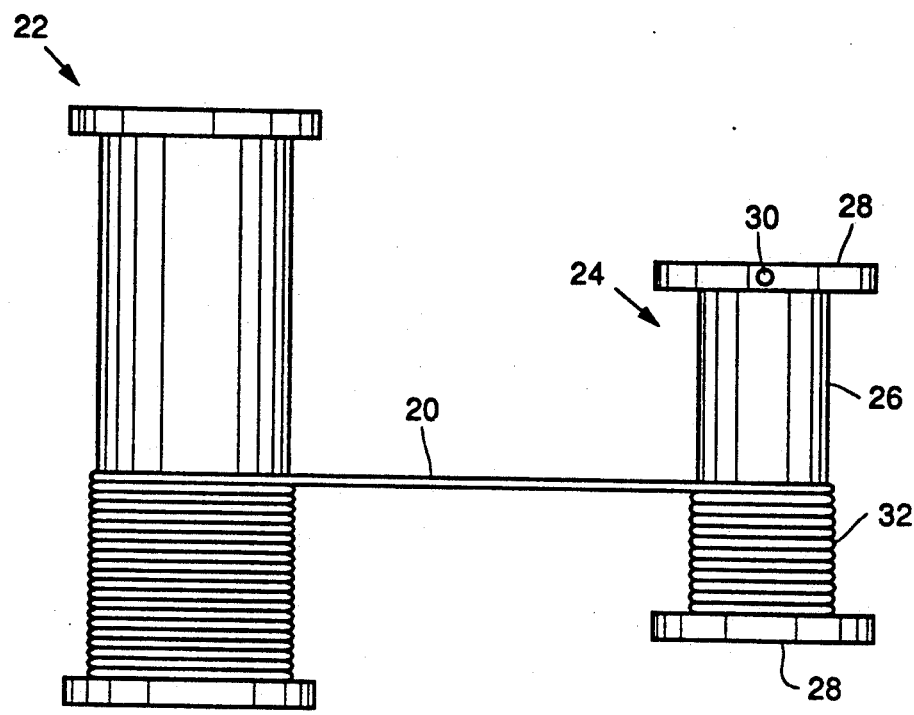
FIG. 3.
FIG. 4.
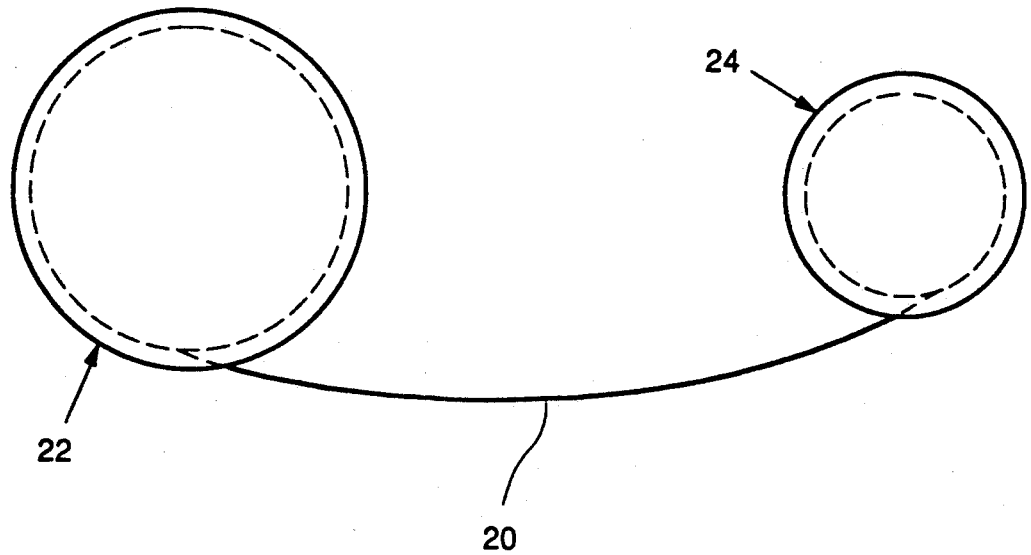

HIGH EFFICIENCY COIL FABRICATION PROCESS

FIELD OF THE INVENTION

The present invention relates to a high efficiency actuator coil fabrication process and more particularly to a process to fabricate wound high purity copper coils that have a high Residual Resistivity Ratio and therefore a high efficiency at cryogenic temperatures.

DESCRIPTION OF THE PRIOR ART

There are many instances where coils must operate with high efficiency. For example, actuator coils must operate with high efficiency. No matter what winding material is used for such actuator coils, all winding materials exhibit resistive losses, and these losses are a major source of actuator power dissipation. In some winding applications, the resistive losses do not present a significant problem. However, many opportunities for the application of actuators having windings with high Residual Resistivity Ratio (RRR) values exist in areas that require a cryogenic environment. RRR is a ratio of electrical resistance at 0° C. to the electrical resistance at a lower temperature.

A specific example of a situation that requires a high efficiency actuator coil may be found in infrared space equipment in which only a fixed volume of cryogen is available for the mission. Such equipment may typically orbit at very high altitudes thereby effectively precluding the replenishment of the liquid helium cryogen supply. Application of a lower power dissipation (high efficiency) actuator would extend the mission life of the space equipment because a high efficiency actuator would evaporate less cryogen for a given operation. An actuator coil having the characteristics of lower power dissipation is also desirable because it would help to reduce the thermal gradients in sensitive instruments or components.

Heretofore, one approach to minimizing the power dissipation in windings such as that found in an actuator has been to use conventional superconducting wire. An example of such a superconducting wire application may be found in J. P. Bugeat, R. Petit, and D. Valentian, Electric motor with super conducting winding, Cryogenics 27:59 (1987). Unfortunately, conventional superconductors are not lossless when used in alternating current (AC) applications. AC produces other losses in low resistivity conventional superconductor windings that can result in greater total power dissipation than high purity copper windings. Also, the diamagnetic property of superconducting wire presents additional design considerations when it is oscillated in the field of a permanent magnet.

It is well known that copper wire has a drastically reduced resistivity at liquid helium temperatures that depends upon the purity of the copper used and its annealed condition. A discussion of the reduced resistivity of copper at low temperatures can be found in F. R. Fickett, Electrical Properties in: "Material at Low Temperatures," R. P. Reed and A. F. Clark, eds., American Society for Metals, Metals Park, Ohio (1983), p. 163. The potential gains corresponding to reduced resistivity are limited by copper's magnetoresistive properties. Electromagnetic actuators also have losses associated with magnetic hysteresis and eddy currents in addition to the resistive losses in the coil. Thus, the choice between superconducting and conventional wire for an electromagnetic actuator is generally not obvious and depends upon the operational requirements and properties of the particular sample of wire to be used.

Extremely low resistivity is reported for some copper samples at liquid helium temperature in "Brookhaven National Laboratory Selected Cryogenic Data Notebook," BNL 10200-R, J. E. Jensen et al., eds., Brookhaven National Laboratory, (1980), p. X-E-6. Investigators have reported that RRR values over 30,000 have been achieved, but these values are most likely not for specimens wound into an actuator coil or other similar applications for such windings, and therefore the reported values do not reflect coldworking processes after final annealing.

SUMMARY OF THE INVENTION

The present invention contemplates a process for fabricating high efficiency actuator coils by using high purity copper having a high RRR value, and therefore a high efficiency at cryogenic temperatures.

The RRR for copper is a function of material purity and conditions to which the wire is subjected. It is well known that some of the benefits of annealing copper are reduced stress and lower resistivity. As the purity of copper is increased the effect of annealing becomes more pronounced.

A high RRR can be achieved by using high purity copper in an annealed condition. Although high purity copper can be specified in the annealed condition from the supplier, handling at the mill can stress the wire and induce enough strain to reduce the RRR significantly. Also, the process of winding the wire onto the actuator bobbin can introduce significant strain if not done properly.

The ideal method for fabricating a high efficiency actuator coil involves annealing the wire winding after it is wound around the actuator bobbin. However, the copper annealing temperature (approximately 400° C.) is typically too high for the other materials used in the finished bobbin. For instance, the coil potting compound necessary for removing heat from the individual windings during actuator use is usually the most susceptible to heat damage from the necessarily high annealing temperatures.

The process of the present invention allows for the fabrication of copper actuator coils having high RRR values from commercially available high purity copper wire that is mill annealed and coated with enamel insulation. The process essentially comprises unwinding a high purity, insulated copper wire from a supply spool received from a mill and winding the wire onto a copper annealing spool with an outside diameter equal to the diameter of an actuator coil bobbin. The annealing spool is then placed in a vacuum furnace, heated to an annealing temperature and held at the annealing temperature for a period of time. Once the insulated copper wire is annealed it is cooled and then wound onto an actuator bobbin in a deliberate and careful manner so as to limit introduction of additional strain in the wire.

One objective of the present invention is to provide a process for fabricating high efficiency actuator coils having high RRR values.

Another objective of the present invention is to provide a process for fabricating low resistivity high purity copper windings from commercially available insulated copper wire.

Another objective of the present invention is to provide a process for fabricating windings for electromagnetic applications where the winding process introduces a minimum of stresses.

Other objects and advantages will become apparent to those skilled in the art from the following detailed description read in conjunction with the attached drawings and the claims appended hereto.

DESCRIPTION OF THE DRAWINGS

FIG. 3 is a side view illustrating a first spooling step of the process showing the transfer of wire from the supply spool to the annealing spool.

FIG. 4 is a top view illustrating the transfer step of FIG. 3.

DETAILED DESCRIPTION OF THE PREFERRED EMBODIMENT

Figure 1:
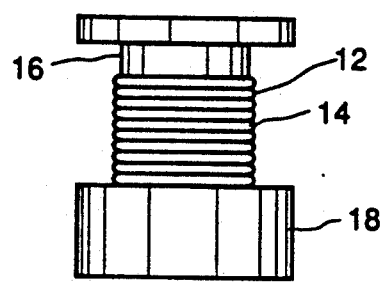
FIG. 1 is a side view of a high efficiency actuator bobbin.

FIG. 1 shows a high efficiency actuator coil 10 as made by a process of the present invention. The high efficiency actuator coil 10 comprises a winding 12 of high purity annealed insulated copper wire 14 having a low resistivity (high RRR value) around the barrel 16 of an actuator bobbin 18.

Figure 2:
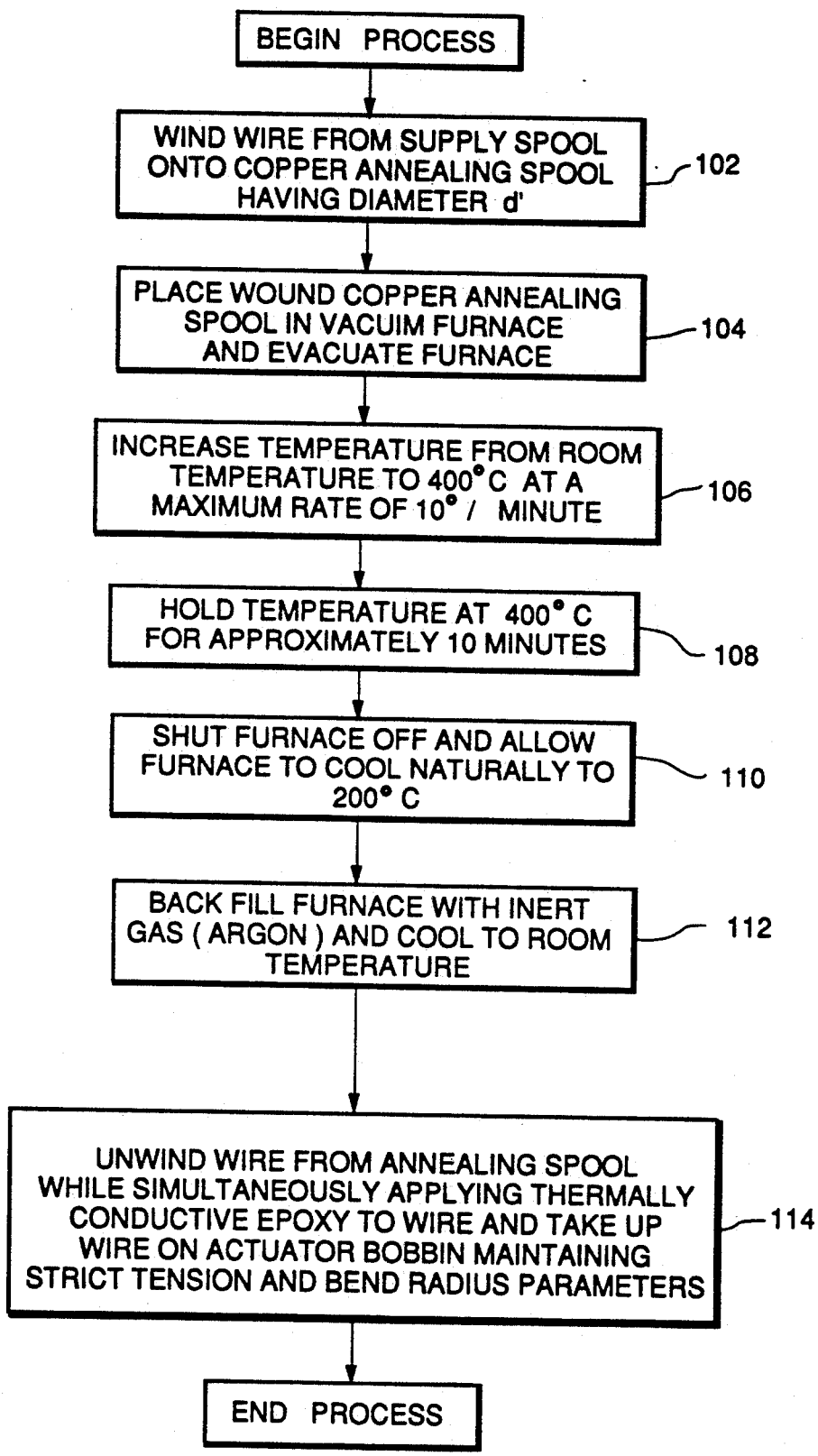
FIG. 2 is a flow chart of the high efficiency actuator coil fabrication process.

The process steps for fabricating a high efficiency actuator coil are shown in FIG. 2. FIGS. 3 and 4 illustrate a first spooling step 102 of the process. Referring to FIGS. 2, 3 and 4, a high efficiency actuator coil fabrication process is begun by a first spooling step 102 wherein a commercially supplied high purity insulated copper wire 20 is unwound from a commercial product supply spool 22, received from a mill, and wound onto a copper annealing spool 24. The copper annealing spool comprises of a barrel 26, and two flanges 28, one having a temperature sensing hole 30. The barrel 26 of the copper annealing spool 24 to which the copper wire 20 is wound has an outside diameter approximately equal to the outside diameter of the barrel 16 of the actuator bobbin 18. In the preferred embodiment, the outside diameter of the barrel 16 of the actuator bobbin 18 is 0.61 inches.

The supply of copper wire 20 used in the process is 99.999% to 99.9999% pure, mill annealed copper wire coated with Pyre-M.L. ™ Wire Enamel insulation. Copper wire coated with Pyre-M.L. ™ Wire Enamel insulation is used in the present invention because wire materials other than copper typically have a lower RRR and Pyre-M.L. Wire Enamel is a known insulating material that can tolerate the high annealing temperature of copper. Pyre-M.L. is an aromatic polyimide produced by the DuPont corporation. The first spooling step 102 is complete when one layer of wire 32 covers the barrel 26 of the copper annealing spool 24. When more than one layer is wound around the annealing spool 24 the additional layers may significantly change the preferred bend radius of the wire 32 when it is later unwound from the annealing spool 24.

The next step 104 of the fabrication process is to place the wound annealing spool 24 into a vacuum annealing furnace. The vacuum annealing furnace provides an oxygen free environment for annealing to avoid oxidation at high temperatures. A temperature sensor, such as a thermocouple, is inserted into the temperature sensor hole 30 of the copper annealing spool 24. The temperature sensor is used to measure the temperature of the copper annealing spool 24 while inside a furnace during an annealing process. The annealing furnace is then evacuated to approximately $5 \times 10^{-6}$ Torr and the temperature of the annealing furnace is ramped from room temperature to approximately 400° C. at a rate of 10° C. per minute during a temperature ramp step 106. Pure copper is nearly instantly annealed at 400° C. The minimum published annealing temperature of copper is 371° C. and the maximum is 650° C., however, the maximum practical annealing temperature is dictated by insulating material considerations. The Pyre-M.L. ™ insulating coating on the copper wire 20 has a continuous duty temperature of 200° C., and can be elevated to higher temperatures for a short period of time. The survival time of the insulation at 400° C. is about 30 minutes after which the insulation develops microcracks and the annealed wire will becomes prone to developing short circuits. Once the temperature of the copper annealing spool 24 has reached 400° C., a temperature hold step 108 is entered where the temperature of the furnace and contents is held constant at 400° C. for approximately 10 minutes. The hold time selected is considerably longer than that necessary to anneal pure copper and yet is considerably shorter than the survival time of the Pyre-M.L. insulating material. Thus, the 10 minute hold period ensures that the copper wire is thoroughly annealed while also ensuring that the insulation material remains intact.

After the hold period of step 108 has expired, the furnace is turned off and an initial vacuum cooling step 110 is begun. The initial vacuum cooling period of step 110 allows the copper annealing spool 24 containing annealed copper wire 34 to cool under vacuum conditions. This step continues until the spool 24 has reached a temperature of approximately 200° C. At 200° C. a final inert gas cooling step 112 is entered where the vacuum is broken by back filling the furnace with an inert gas, such as argon. An inert gas is used so as not to interact with coil materials which are still at high temperatures during this step. The final inert gas cooling period ends when the copper annealing spool 24 reaches room temperature.

Figure 5:
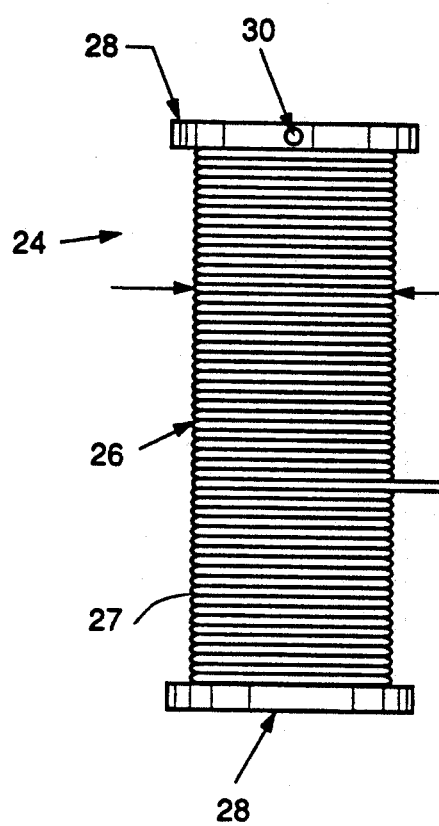
FIG. 5 is a side view illustrating a second spooling step of the process showing the transfer of wire from the annealing spool to the actuator bobbin.
Figure 5:
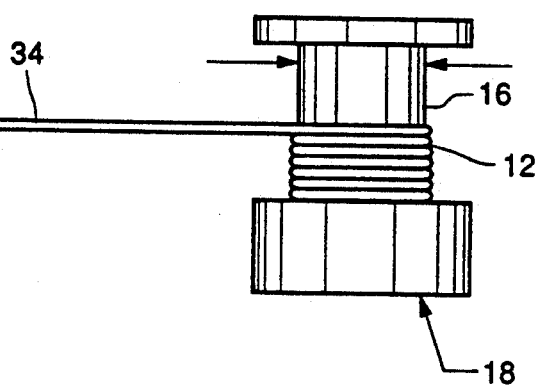
Figure 6:
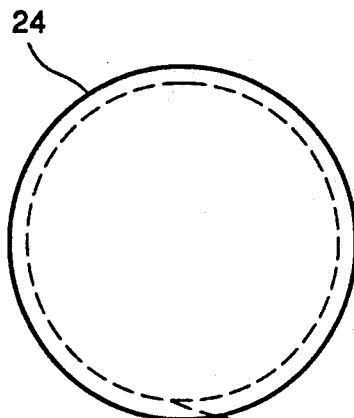
FIG. 6 is a top view illustrating the transfer step of FIG. 5.
Figure 6:
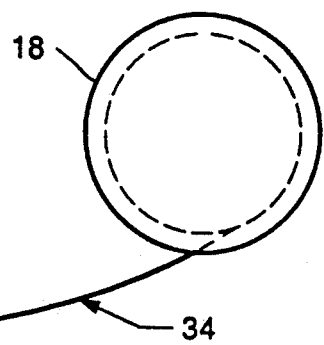

Referring to FIGS. 2, 5 and 6, step 114 illustrates that a final winding is begun by carefully unwinding the layer of annealed high RRR wire 34 from the copper annealing spool 24 and winding the wire onto barrel 16 of actuator bobbin 18. The unwinding and winding process may be conducted manually or automatically but must be conducted in a manner to minimize the straightening and tensioning of the wire 34.

The wire 34 is allowed to assume its natural bend radius when unwound from the annealing spool 24, thereby resulting in minimum straightening of the wire. Manual unwinding and winding of the wire 34 can ensure minimum tensioning.

Strain minimization in a number 34 gauge wire is accomplished by ensuring that the wire tension does not exceed 6.4 ounces and the wire bend radius be not less than 0.31 inches. A number 34 gauge wire wound around a 0.61 inch diameter annealing spool 24 which is not straightened from a bend radius of 0.31 inches or bent to less than a 0.31 inch bend radius exhibits an increased stress of approximately one percent due to the unwinding process.

Thus, by maintaining the above parameters while unwinding and winding the wire, a high RRR is preserved in the wire. It is possible to practice this invention with other gauges of wire and barrels of other diameters. The relationship of strain to bend radius for any size wire can be derived from classical solid mechanics. Whatever gauge wire is used, minimizing winding induced strain during the winding process to less than one percent helps ensure a wire winding product with a relatively high RRR.

As the wire 34 is fed from the copper annealing spool 24, the wire 34 is wetted with a thermally conductive epoxy such as Emerson-Cuming Stycast TM 2850FT/24LV. Other thermally conductive epoxies suitable for the operating temperature may be used, however, E-C Stycast TM 2850FT/24LV has worked successfully at 4° K. and below. The wetting epoxy provides a path for the heat generated in the winding 20 from the flow of electrical current to be removed.

Thus, the present invention provides a simple process for making a high efficiency actuator coil. The process may be carried out without the use of exotic materials or equipment, and thus is inexpensive.

What is claimed is:

1. A process for fabricating a coil of wire having low resistivity at cryogenic temperatures, comprising the steps of:
   1) winding wire onto an annealing spool having a barrel;
   2) annealing said wire while on the annealing spool; and
   3) unwinding said wire from said annealing spool so as to allow said wire to take its natural bend radius and to induce minimal wire tension and winding said wire onto a coil spool having a barrel.

2. The process of claim 1, comprising the additional step of selecting annealing spool having a barrel with an outside diameter approximately equal to an outside diameter of the barrel of said coil spool.

3. The process of claim 1, wherein the amount of wire wound around the annealing spool forms a single layer over the barrel.

4. The process of claim 1, wherein the annealing step is performed in a vacuum.

5. The process of claim 1, wherein the annealing step comprises the substeps of:
   a) raising the temperature of the wire to an annealing temperature in a controlled manner;
   b) maintaining the wire at an annealing temperature for a period of time; and
   c) cooling the wire in a controlled manner.

6. The process of claim 5, wherein the annealing step is performed in a vacuum.

7. The process of claim 5, wherein the step of raising the temperature in a controlled manner comprises the step of increasing the temperature in increments to the annealing temperature.

8. The process of claim 7, wherein the increments are based on time.

9. The process of claim 8, wherein the increments are less than 10° C. per minute.

10. The process of claim 5, wherein the wire is coated with an insulating coating having a survival time which maintains the insulating properties of the coating if the coating is not subjected to a temperature, T, for a period of time greater than S, where S is called the survival time for temperature T, the period of time at which the wire is maintained at an annealing temperature T is at least equal to a period of time required to anneal the wire and no longer than the survival time of the insulating coating on the wire for temperature T.

11. The process of claim 10, wherein the period of time at which the wire is maintained at an annealing temperature, T, is in the range of 0 to 30 minutes.

12. The process of claim 10, wherein the coating is an aromatic polyimide such as Pyre-M.L. Wire Enamel.

13. The process of claim 10, wherein the preferred period of time at which the wire is maintained at an annealing temperature T is 10 minutes.

14. The process of claim 10, wherein the preferred annealing temperature T is 400° C.

15. The process of claim 6, wherein substeps a and b are performed by a heat source and where the step of cooling in a controlled manner includes the substeps of:
   removing the heat source from the wire; and
   allowing the wire to cool in the vacuum.

16. The process of claim 15, further comprising the step of releasing the vacuum when the wire temperature is above room temperature.

17. The process of claim 16, wherein the temperature at which the vacuum is released is below 200° C.

18. The process of claim 16, wherein the step of releasing the vacuum comprises a step of introducing an inert gas.

19. The process of claim 18, wherein the inert gas is argon.

20. The process of claim 1, additionally comprising the step of: applying a heat conducting coating to the wire while unwinding the wire from said annealing spool and winding onto a coil spool.

21. The process of claim 20, wherein the heat conductive coating is a thermally conductive epoxy such as E-C Stycast TM.

22. The process of claim 1, wherein the wire is copper.

23. A process for fabricating a coil of wire having low resistivity at cryogenic temperatures using an annealing spool and a coil spool, comprising the steps of:
   winding wire onto the annealing spool, said annealing spool having an outside diameter approximately equal to the outside diameter of a coil spool;
   annealing said wire while on the annealing spool by raising the temperature of said wire in a controlled manner to an annealing temperature maintaining said wire at said annealing temperature for a period of time, and cooling said wire in a controlled manner;
   unwinding the wire from the annealing spool so as to allow the unwound wire to take its natural bend radius; and winding said wire onto the coil spool so as to induce minimal tension.

24. The process of claim 23, additionally comprising the step of: applying a heat conducting coating to the wire while unwinding the wire from said annealing spool.

25. A process for fabricating a coil of wire having low resistivity, at cryogenic temperatures comprising the steps of:
   winding wire coated with an insulative coating having a survival time which maintains the insulative properties of the coating if the coating is not subject to a temperature, T, for a period of time greater than S, where S is called the survival time for temperature T onto an annealing spool, said annealing spool having an outside diameter approximately equal to an outside diameter of a coil spool;

annealing said wire on said annealing spool in a vacuum by raising the temperature of the wire incrementally based on time to an annealing temperature, maintaining the wire at an annealing temperature for a period of time at least equal to a period time required to anneal the wire and not longer than the survival time of the insulating coating on the wire for temperature T, and cooling said wire by removing the heat source and releasing the vacuum at a temperature above room temperature; and unwinding the annealed wire in a manner that allows unwound wire to take its natural bend radius and winding the annealed wire in a manner so as to induce minimal wire tension.

26. The process of claim 25, additionally comprising the step of applying a heat conducting coating to the wire while simultaneously unwinding from said annealing spool and winding onto a coil spool.

* * * * *